Sept. 24, 1929.   J. A. REECE   1,729,125
METHOD AND APPARATUS FOR PRODUCING LAMINATED GLASS
Filed Sept. 20, 1926
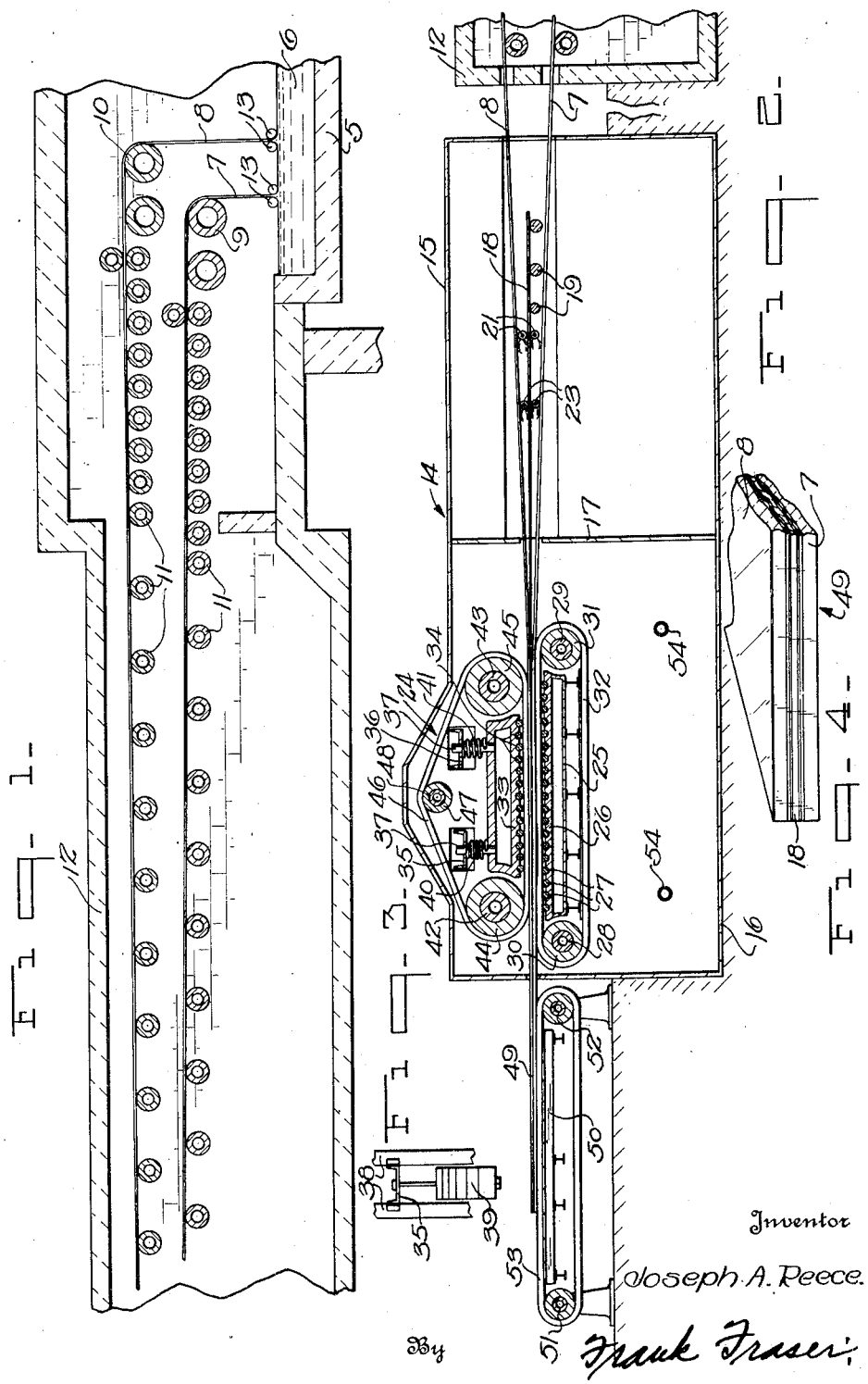
Inventor
Joseph A. Reece.
By Frank Fraser,
Attorney Patented Sept. 24, 1929

1,729,125

UNITED STATES PATENT OFFICE

JOSEPH A. REECE, OF TOLEDO, OHIO, ASSIGNOR TO LIBBEY-OWENS GLASS COMPANY, OF TOLEDO, OHIO, A CORPORATION OF OHIO

METHOD AND APPARATUS FOR PRODUCING LAMINATED GLASS

Application filed September 20, 1926. Serial No. 136,391.

This invention relates to an improved method and apparatus for producing laminated glass.

The primary object of the invention is to provide improved apparatus whereby a ribbon of laminated glass may be continuously produced.

Another important object of the invention is to provide in the art of producing laminated glass improved apparatus for forming a plurality of glass ribbons and for subsequently interposing between the ribbons one or more non-brittle sheets of material before said ribbons are cut into sheet form.

Another object of the invention is the provision of novel means for uniting the glass ribbons and non-brittle sheet or sheets of material whereby to create a unitary structure.

Another object of the invention is the provision of improved apparatus for applying sufficient pressure to the glass ribbons and non-brittle sheet or sheets of material to unite them to form a unitary structure after the annealing of the said ribbons and prior to the cutting thereof into sheet form.

A further object of the invention is to provide novel means for simultaneously uniting the glass ribbons and non-brittle sheet or sheets of material and delivering them onto a cutting table.

A further object of the invention is to provide novel means for applying a suitable binder to the adjacent sides of the glass ribbons and non-brittle sheet or sheets of material.

A further object of the invention is the provision of means for successively applying a skin and a film to the adjacent sides of the glass ribbons and non-brittle sheet or sheets of material prior to the uniting thereof.

A still further object of the invention is the provision of means for varying the pressure utilized for uniting the glass ribbons and non-brittle sheet or sheets of material.

Other objects and advantages of the invention will become more apparent during the course of the following description when taken in connection with the accompanying drawings.

In the drawings wherein like numerals are employed to designate like parts throughout the same, Fig. 1 is a vertical longitudinal section through a portion of the improved apparatus provided by the present invention, Fig. 2 is a vertical longitudinal section through another portion of the improved apparatus, Fig. 3 is a detail view showing the manner in which the ends of the supporting channel beams are mounted, and Fig. 4 is a detail perspective view of a portion of finished laminated glass produced by the present apparatus.

The present invention consists generally in first forming a plurality of glass ribbons which are then passed through an annealing operation, interposing between the ribbons, after they have been annealed, one or more non-brittle sheets of material, applying to the adjacent sides of the glass ribbons and non-brittle sheet or sheets of material a suitable binder, and subsequently uniting the said glass ribbons and non-brittle sheet or sheets of material to form a unitary structure, and delivering the same onto a cutting table where the ribbons may be cut into sheet form.

Referring now more to the drawings, the numeral 5 designates a draw pot adapted to contain a mass of molten glass 6. This molten glass is fed into the draw pot from a suitable tank furnace, not shown, where it has been previously conditioned, and the draw pot is customarily heated from beneath by suitable apparatus which is also not illustrated.

Adapted to be drawn from the draw pot 5 is a pair of continuous glass sheets or ribbons 7 and 8, these ribbons being initially drawn in an upward direction and subsequently deflected in a horizontal plane over bending rolls 9 and 10, respectively, the bending roll 10 being positioned somewhat above the bending roll 9.

The ribbons 7 and 8 are then carried in a horizontal direction upon suitable horizontally alined rollers 11 through an annealing leer 12 wherein the temperature of the glass is gradually reduced to room temperature, as is well known. The rolls 11 are preferably hollow to permit a suitable cooling medium to be continuously circulated therethrough to control the temperature of the ribbons passing thereover. Edge treating means 13 is also provided adjacent the mass of molten glass 6 to assist in maintaining the ribbons to width. It is to be noted that throughout the annealing operation the ribbons 7 and 8 are held spaced from one another.

After the ribbons 7 and 8 have been properly annealed and emerge from the end of the leer 12, as shown in Fig. 2, they are adapted to pass horizontally into an elongated housing, designated in its entirety by the numeral 14, and comprising a receiving chamber 15 at one end thereof, and a uniting chamber 16 at the opposite end thereof, separated by a vertical partition wall 17. The ribbons 7 and 8 pass first into the receiving chamber 15 of the housing 14, and as the ribbons travel horizontally therethrough, there is interposed therebetween one or more non-brittle sheets of material 18, which are supported upon suitable horizontally alined rollers 19.

After the non-brittle sheet or sheets of material 18 have been interposed between the glass ribbons, there is applied to the adjacent sides of the ribbons and non-brittle sheet or sheets of material first a skin and then a film which serve as a binder to hold the ribbons and non-brittle sheet or sheets together to form a unitary structure. The skin is first applied and is preferably sprayed thereon by suitable means 21, after which the film is subsequently sprayed on top of the skin by suitable means 23. The spraying means 21 and 23 extend the entire width of the ribbons so that the skin and film will be evenly distributed thereon throughout their entire area.

After the application of the skin and film has been accomplished, the ribbons 7 and 8 and non-brittle sheet or sheets of material 18 are passed through an opening in the partition wall 17 and between suitable drawing and uniting mechanism located within the uniting chamber 16, and designated in its entirety by the numeral 24. This uniting mechanism embodies a draw table 25 provided with a relatively large flat horizontal top 26 which extends the entire width of the ribbons and within which are mounted a plurality of spaced rotatable rollers 27. Arranged at opposite ends of the draw table 25 are transverse shafts 28 and 29 upon which are mounted rollers 30 and 31, and about which is trained an endless belt 32 which also extends the entire width of the ribbons, the upper run of said belt being adapted to rest upon the rollers 27.

Arranged above the draw table 25 is a pressure plate 33 extending the entire width of the ribbons and having mounted in its lower face a plurality of spaced idler rotatable rollers 34 similar to the rollers 27. The pressure plate 33 is supported by suitable channel beams 35 and 36, being secured thereto by vertical pins 37, said pins being fixed to the said pressure plate and loosely received through the supporting beams 35 and 36. The supporting beams 35 and 36 are arranged transversely within the uniting chamber 16 and project outwardly through the side walls thereof, the opposite ends of the said supporting beams being mounted between vertical guides 38. Carried by the supporting beams 35 and 36, exteriorly of the housing 14, are suitable weights 39 which act to normally urge the pressure plate 33 towards the draw table 25. The size and heaviness of these weights can of course be varied according to the amount of pressure desired. Surrounding the pins 37, between the supporting beams 35 and 36 and pressure plate 33, are cushion springs 40 and 41.

Positioned at opposite ends of the pressure plate 33 are transverse shafts 42 and 43 upon which are mounted rollers 44 and 45, and about which is trained an endless belt 46 extending the entire width of the glass ribbons 7 and 8. The belt 46 is also trained over an idler roller 47 mounted upon shaft 48.

In order to unite the glass ribbons 7 and 8 and non-brittle sheet or sheets of material 18 to form a unitary structure, they are passed horizontally, after being coated with a suitable binder, between the uniting mechanism hereinabove set forth, and more specifically between the endless belts 32 and 46. As the glass ribbons and non-brittle sheet or sheets are drawn by the endless belts between the draw table 25 and pressure plate 33, they will be united to form a permanent union by means of the pressure exerted thereupon by the pressure plate 33. The glass ribbons and non-brittle sheet or sheets, after being united to form the unitary structure 49, are delivered exteriorly of the housing 14 onto a cutting table or the like 50 by means of the endless belts 32 and 46. Arranged at opposite ends of the cutting table 50 are rollers 51 and 52, about which is trained an endless belt 53, the upper run thereof resting upon the cutting table 50. The finished glass 49 is carried onto the cutting table 50 by the endless belt 53, and the glass ribbons can then be cut into sheet form as desired. Suitable burners 54 can be arranged within the uniting chamber 16 to heat and control the temperature of the glass ribbons during the pressing thereof.

Due to the fact that the draw table 25 and the pressure plate 33 extend the entire width of the glass ribbons assures an even distribution of pressure throughout the width thereof. If desired, the pressure exerted on the channel beams 36 by the weights 39 can be less than that on the channel beams 35, so that the glass ribbons and non-brittle sheet can be gradually compressed as they travel therebeneath. Of course, any number of glass ribbons can be drawn from the draw pot 5, and one or more non-brittle sheets of material interposed therebetween. Consequently, the present invention is not to be restricted to the drawing of only two glass ribbons and the interposing therebetween of one non-brittle sheet of material as illustrated in the drawing. Also, the glass ribbons need not necessarily be drawn from a mass of molten glass but may be formed in some other manner, if desired.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. The method of producing laminated glass, which consists in feeding a plurality of glass sheets and a sheet of non-brittle plastic material arranged in superimposed relation in a generally horizontal direction, and in uniting all of said sheets during the travel thereof to form a composite sheet.

2. The method of producing laminated glass, which consists in feeding a plurality of glass sheets in a generally horizontal direction, and in interposing a non-brittle plastic sheet of material between the glass sheets during the travel thereof.

3. The method of producing laminated glass, which consists in feeding a plurality of glass sheets and a sheet of non-brittle material arranged in superimposed relation in a generally horizontal direction, applying to the adjacent sides of the glass sheets and sheet of non-brittle material during the travel thereof a suitable binder, and in then uniting all of said sheets during the travel thereof to form a composite sheet.

4. The method of producing laminated glass, which consists in feeding a plurality of glass sheets in a generally horizontal direction, interposing a non-brittle plastic sheet of material between the glass sheets during the travel thereof, and in then uniting the glass sheets and sheet of non-brittle material to form a composite sheet.

5. The method of producing laminated glass, which consists in feeding a plurality of glass sheets arranged in superimposed relation in a generally horizontal direction, interposing a non-brittle plastic sheet of material between the glass sheets during the travel thereof, and in then uniting the glass sheets and sheet of non-brittle material also during the travel thereof to form a composite sheet.

6. The method of producing laminated glass, which consists in feeding a plurality of glass sheets in a generally horizontal direction, interposing a non-brittle sheet of material between the glass sheets during the travel thereof, applying to the adjacent sides of the glass sheets and sheet of non-brittle material a suitable binder, and in then subsequently uniting all of said sheets to form a composite sheet.

7. The method of producing laminated glass, which consists in feeding a plurality of glass sheets arranged in superimposed relation in a generally horizontal direction, interposing a non-brittle sheet of material between the glass sheets during the travel thereof, applying to the adjacent sides of the glass sheets and sheet of non-brittle material also during the travel thereof a suitable binder, and subsequently subjecting the said sheets also while traveling to pressure to unite them to form a composite sheet.

8. The method of producing laminated glass, which consists in feeding a plurality of glass sheets in a generally horizontal direction, interposing a non-brittle sheet of material between the glass sheets during the travel thereof, successively applying to the adjacent sides of the glass sheets and sheet of non-brittle material a skin and then a film, and subsequently uniting all of said sheets to form a composite sheet.

9. The method of producing laminated glass, which consists in feeding a plurality of glass sheets arranged in superimposed relation in a generally horizontal direction, interposing a non-brittle sheet of material between the glass sheets during the travel thereof, successively applying to the adjacent sides of the glass sheets and sheet of non-brittle material also during the travel thereof a skin and then a film, and subsequently subjecting said sheets while traveling to pressure to unite them to form a composite sheet.

10. The method of producing laminated glass, which consists in feeding a plurality of glass sheets in a generally horizontal direction, interposing a non-brittle plastic sheet of material between the glass sheets during the travel thereof, uniting said glass sheets and sheet of non-brittle material to form a unitary structure, and in controlling the temperature of said sheets during the uniting thereof.

11. In apparatus for producing laminated glass, the combination with means for feeding a plurality of glass sheets and a sheet of non-brittle plastic material arranged in superimposed relation in a generally horizontal direction, and means for subsequently uniting all of said sheets during the travel thereof to form a composite sheet.

12. In apparatus for producing laminated glass, the combination with means for feeding a plurality of glass sheets and a sheet of non-brittle material arranged in superimposed relation in a generally horizontal direction, of means for applying a suitable binder to the adjacent surfaces of the glass sheets and sheet of non-brittle material during the feeding thereof, and means for uniting all of said sheets while traveling to form a composite sheet.

13. In apparatus for producing laminated glass, the combination with means for feeding a plurality of glass sheets in a generally horizontal direction, of means for interposing a non-brittle plastic sheet of material between adjacent sheets of glass during the travel thereof.

14. In apparatus for producing laminated glass, the combination with means for feeding a plurality of glass sheets in a generally horizontal direction, of means for interposing a non-brittle plastic sheet of material between adjacent sheets of glass during the travel thereof, and means for subsequently uniting the glass sheets and sheet of non-brittle material to form a composite sheet.

15. In apparatus for producing laminated glass, the combination with means for feeding a plurality of glass sheets in a generally horizontal direction, of means for interposing a non-brittle plastic sheet of material between adjacent sheets of glass during the travel thereof, and means for uniting the glass sheets and sheet of non-brittle material also while in travel by the combined action of heat and pressure.

16. In apparatus for producing laminated glass, the combination with means for feeding a plurality of glass sheets in a generally horizontal direction, of means for interposing a non-brittle sheet of material between adjacent sheets of glass during the travel thereof, means for applying a suitable binder to the adjacent surface of the glass sheets and sheet of non-brittle material, and means for then uniting all of said sheets to form a composite sheet.

17. In apparatus for producing laminated glass, the combination with means for feeding a plurality of glass sheets arranged in superimposed relation in a generally horizontal direction, of means for interposing a non-brittle sheet of material between adjacent sheets of glass during the travel thereof, means for applying a suitable binder to the adjacent sides of the glass sheets and sheet of non-brittle material also during the travel thereof, and means for subsequently subjecting said sheets while traveling to pressure to unite them to form a composite sheet.

18. In apparatus for producing laminated glass, the combination with means for feeding a plurality of glass sheets in a generally horizontal direction, of means for interposing a non-brittle sheet of material between adjacent sheets of glass during the travel thereof, means for successively applying a skin and then a film to the adjacent surfaces of the glass sheets and sheet of non-brittle material, and means for uniting all of said sheets to form a composite sheet.

19. In apparatus for producing laminated glass, the combination with means for feeding a plurality of glass sheets arranged in superimposed relation in a generally horizontal direction, of means for interposing a non-brittle sheet of material between adjacent sheets of glass during the travel thereof, means for successively applying a skin and then a film to the adjacent surfaces of the glass sheets and sheet of non-brittle material also during the travel thereof, and means for subjecting the said sheets while traveling to pressure to unite them to form a composite sheet.

20. In apparatus for producing laminated glass, the combination with means for feeding a plurality of glass sheets in a generally horizontal direction, of means for interposing a non-brittle plastic sheet of material between the glass sheets during the travel thereof, means for uniting the glass sheets and sheet of non-brittle material to form a unitary structure, and means for controlling the temperature of said sheets during the uniting thereof.

Signed at Toledo, in the county of Lucas and State of Ohio, this 17th day of September, 1926.

JOSEPH A. REECE.